(12) United States Patent
van den Berg

(10) Patent No.: US 7,353,772 B1
(45) Date of Patent: Apr. 8, 2008

(54) IMPLEMENT FOR FEEDING AND/OR WATERING ANIMALS

(75) Inventor: Karel van den Berg, Bleskensgraaf (NL)

(73) Assignee: Lely Research Holding AG, Zug (CH)

( * ) Notice: Subject to any disclaimer, the term of this patent is extended or adjusted under 35 U.S.C. 154(b) by 0 days.

(21) Appl. No.: 09/643,965

(22) Filed: Aug. 23, 2000

(30) Foreign Application Priority Data

| Dec. 24, 1998 | (NL) | ................................. 1010898 |
| Apr. 15, 1999 | (NL) | ................................. 1011799 |
| Dec. 21, 1999 | (WO) | ................... PCT/NL99/00792 |

(51) Int. Cl.
*A01K 1/10* (2006.01)
*A01K 39/00* (2006.01)
*A01K 5/00* (2006.01)

(52) U.S. Cl. ............................ 119/6; 119/74; 119/52.1; 119/58

(58) Field of Classification Search ................. 119/61, 119/74, 58, 51.5, 51.03, 55, 52.1, 729, 52.4, 119/51.02, 57.5, 53, 61.31, 61.1; D30/121, D30/131, 127, 130; D7/553.1, 553.6; 220/507, 220/553, 555; 206/507, 504, 558
See application file for complete search history.

(56) References Cited

U.S. PATENT DOCUMENTS

| 111,122 | A | * | 1/1871 | Hovenden |
| 364,557 | A | * | 6/1887 | Walin |
| 653,209 | A | * | 7/1900 | Buck |
| 1,127,572 | A | * | 2/1915 | Yeakel |
| 2,254,585 | A | * | 9/1941 | Travis |
| D160,688 | S | * | 10/1950 | Brock |
| 2,580,106 | A | | 12/1951 | Lattimer ...................... 119/61 |
| 3,149,610 | A | * | 9/1964 | Vanpeursern |
| D201,670 | S | * | 7/1965 | Moore |
| 3,336,907 | A | * | 8/1967 | Thompson |
| D294,531 | S | * | 3/1988 | Neunzig .................... D30/130 |
| D302,753 | S | * | 8/1989 | Zelinger .................... D30/129 |

(Continued)

FOREIGN PATENT DOCUMENTS

DE         48169         1/1889

(Continued)

*Primary Examiner*—Andrea M. Valenti
(74) *Attorney, Agent, or Firm*—Howrey LLP

(57) ABSTRACT

A structure for feeding and watering animals, such as cows, goats or lamas which is provided with feeding troughs and comprises an imaginary vertical axis around which the feeding troughs are disposed at a fixed distance therefrom. The individual feeding troughs are overlapping whereby every other one is at a height above the two adjacent feeding troughs. The animals are able to position themselves side by side around the structure and to feed at the feeding troughs so that they are almost touching each other. The feeding troughs are substantially identical to each other and partitions are provided between adjacent feeding troughs so that the animals will not impede adjacent animals eating at an adjacent feeding trough or be able to eat fodder from an adjacent feeding trough. The number of feeding troughs in the disclosed structure is fourteen. Instead of having the overlapping feeding troughs adjacent so that they are spaced at different heights, there may be two series having different radii from the imaginary vertical axis so that the series are at different distances from the center of the structure.

4 Claims, 7 Drawing Sheets

U.S. PATENT DOCUMENTS

| | | | | |
|---|---|---|---|---|
| D304,870 S | * | 11/1989 | Mason | D30/115 |
| D326,743 S | * | 6/1992 | Haynes | D30/130 |
| 5,125,363 A | * | 6/1992 | McGaha | 119/51.5 |
| 5,588,395 A | * | 12/1996 | Lee | 119/72 |
| D379,684 S | * | 6/1997 | Dennis | D30/130 |
| D401,810 S | * | 12/1998 | Swift | D7/553 |

FOREIGN PATENT DOCUMENTS

| | | | |
|---|---|---|---|
| EP | 0806136 A1 | * | 5/1997 |

* cited by examiner

IMPLEMENT FOR FEEDING AND/OR WATERING ANIMALS

RELATED APPLICATION

This Application is a continuation of International Application No. PCT/NL99/00792, filed Dec. 21, 1999.

1. Field of the Invention

The invention relates to a structure for providing feed or water or both to animals wherein the troughs partially overlap each other.

2. Background of the Invention

Such structure is described in Dutch Application No. NL-A-1010898, filed Dec. 24, 1998, which is a priority Application to the instant Application. It discloses a column for providing feed or water or both for animals, such as cows, which is provided with feeding troughs and is included in the present Application by reference.

The implement described in such Application may, however, be improved by reducing the size of the structure. The fact is that the structure occupies a considerable amount of space in the cow shed, while relatively few animals can be fed simultaneously on the basis of the number of feeding troughs which the structure provides.

Since the introduction of the milking robot which automatically milks animals, a relatively large number of animals spend a great deal of time in a shed which is provided for them. Therefore, the shed should comprise facilities for milking and feeding the animals. Besides, there should remain sufficient freedom of movement for the animals, so that they are able to walk easily to the milking robot. Moreover, the animals are accustomed by nature to walk about and to graze in a group. However, a shed having a large surface area is expensive. Therefore, an efficient use of the space in the shed is of major importance for the purpose of keeping as many animals as possible in an optimal condition on a smallest possible surface area, while still providing enough room for the animals to walk about freely. By so doing, an economical and efficient management of the animals and the process of milking and feeding them are provided.

SUMMARY OF THE INVENTION:

An object of the invention is to utilize the space in the shed as effectively as possible and to feed as many animals as possible simultaneously by means of a structure or structures occupying as little as possible of the available space. For that purpose, in accordance with the invention, the feeding troughs overlap each other partially as seen in plan view. In this manner there is obtained a considerable space saving because the animals are able to eat closer together. The herd behavior of the animals is not disturbed, because large numbers of animals are able to eat and drink at the same time. As a result of the specific arrangement of the feeding troughs, the structure or structures exert a great attraction on the animals. Further, transport and storage of the structure or structures are simplified because they occupy a minimal amount of space. The partial overlap of the feeding troughs as seen in plan view is achieved in practice by arranging the feeding troughs side by side at different levels, certain parts of the feeding troughs overlapping each other.

In accordance with an inventive feature, the structure comprises an imaginary axis around which the feeding troughs are disposed at a fixed distance from the imaginary axis. When the feeding troughs are disposed in a circular form around the imaginary axis, the feeding structure occupies less space in the shed. The animals are able to position themselves side by side around the feeding troughs and to approach the feeding troughs up where they almost touch each other. Due to the fact that, seen in plan view, the feeding troughs are located around an imaginary axis so as to overlap each other, the resulting structure is such that relatively many animals are fed, while the structure occupies relatively little surface area in the shed.

In a preferred embodiment of the invention, the feeding troughs are substantially identical. By making use of uniform feeding troughs production costs of the structure are maintained at a low level.

A solution to the problem of efficiently providing feeding troughs for feeding animals, Ore enabling the feeding of relatively many animals simultaneously while occupying relatively little surface area in the shed, may also be obtained by means of an alternative structure. This structure for the feeding or watering or both of animals, such as cows, is to provide several feeding troughs, wherein the structure comprises an imaginary axis around which a first series of feeding troughs is disposed at a first fixed distance from the imaginary axis, and a second series of feeding troughs is disposed at a second fixed distance from the imaginary axis, the arrangement being such that, seen in plan view, a first radius extending from the imaginary axis through the center of a feeding trough of the first series and a second radius extending from the imaginary axis through the center of an adjacent feeding trough of the second series enclose an angle greater than zero. Such a structure is also a solution to the problem how to utilize the space in the shed as efficiently as possible and how to feed as many animals as possible simultaneously by means of feeding and watering structure occupying a minimum of space. The feeding troughs of the first series and the feeding troughs of the second series are located at different distances from the imaginary axis. In comparison with the first structure described, this structure occupies almost the same surface area of the shed when the same number of animals is positioned around the imaginary axis. However, the radius of the structure is longer because of the fact that the feeding troughs are disposed at two different distances from the imaginary axis. The feeding troughs of the first series and the feeding troughs of the second series are substantially identical.

In accordance with an inventive feature, the structure comprises one or more floorboards extending below one or more feeding troughs and having an inclination in the direction of the imaginary axis. By means of the inclined floorboards the feeding troughs are more accessible to the animals. Moreover, in this situation the animals are in a more comfortable position when they are eating. Seen in plan view, the feeding troughs overlap each other. In practice the feeding troughs are disposed side by side at different levels around the imaginary axis. In a preferred embodiment, below the feeding troughs arranged close to the bottom there may be disposed a floorboard extending from the imaginary axis and having an upward inclination as seen from the imaginary axis. In a preferred embodiment, below the feeding troughs arranged farther from the bottom there may be disposed a floorboard extending from the imaginary axis and having a downward inclination as seen from the imaginary axis. In a preferred embodiment, the inclination ranges approximately between 1° and 30°. Cows, especially, enjoy eating when they are in an inclined position.

In a particular embodiment of the invention, the structure may be provided with one or more partition elements which are dimensioned and designed so as to prevent the animals from interfering with each other during eating or drinking as well as to prevent the animals from eating or drinking or both from each other's feeding troughs. It is important, in particular, a structure in which the feeding troughs overlap each other that the animals eat and drink from the right feeding trough. This is achieved by arranging the partitions in such a manner that, when approaching the structure in the direction of the imaginary axis, the animal can only observe one feeding trough. Moreover, the partitions have a particular shape, which also contributes to ensuring that the animals eat from the right feeding trough. For that purpose, the partition is provided with a curve at the side of the partition located closest to the imaginary axis.

According to another inventive feature, the structure is preferably designed in the form of a movable column. In this manner the structure can easily be used at and moved to any desirable place in the shed. In particular the structure is considered to be comprehended by the structure disclosed in the aforementioned Application No. NL-A-1010898.

BRIEF DESCRIPTION OF THE DRAWINGS

The implement will now be explained in further detail with reference to the following figures.

DETAILED DESCRIPTION OF THE PREFERRED EMBODIMENT

Figure 1:
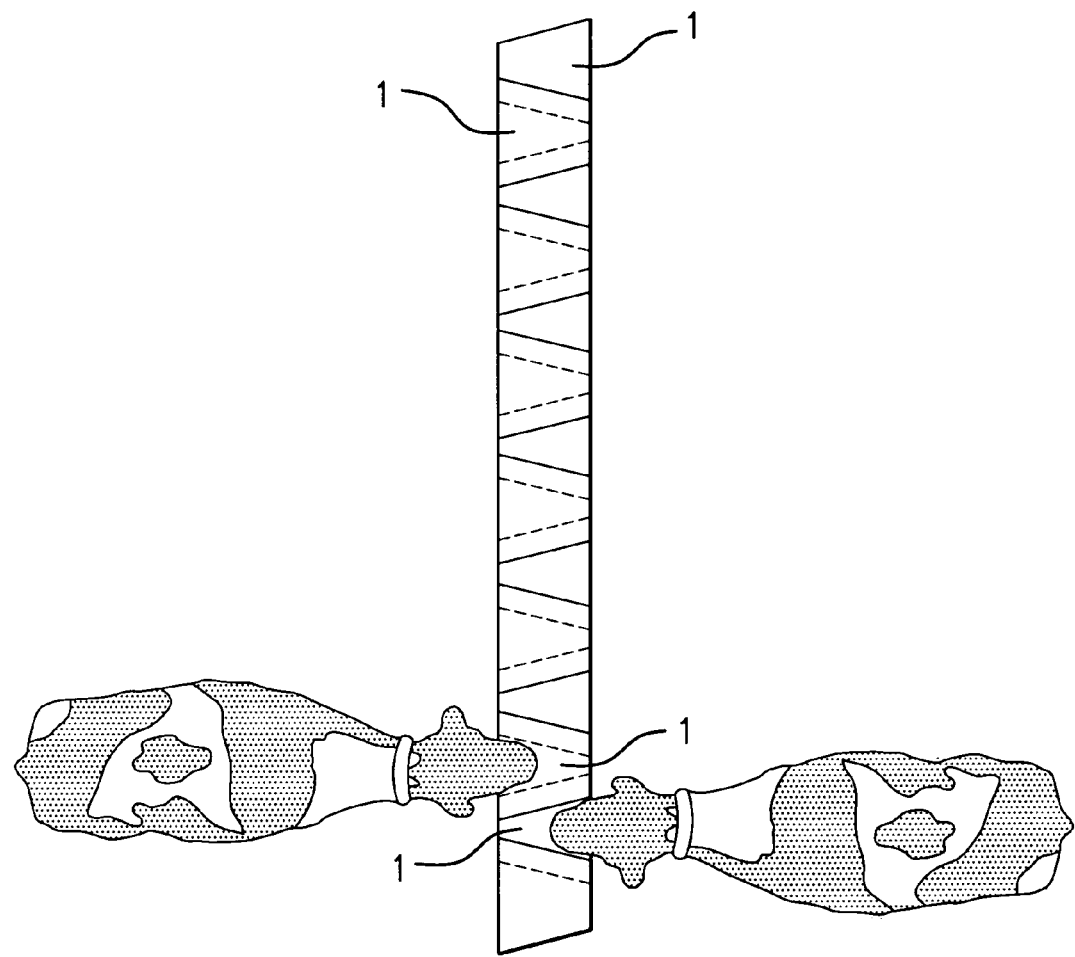
FIG. 1 is a plan view of a structure for feeding animals according to the invention, the feeding troughs overlapping each other.

FIG. 1 is a plan view of a structure for feeding animals according to the invention, the feeding troughs 1 overlapping each other. The feeding troughs 1 are identical. The structure shown is adapted for feeding fourteen animals simultaneously. In this figure feeding troughs 1 are arranged side by side in a row. In comparison with a structure in which the same number of feeding troughs 1 are arranged in a row in a non-overlapping manner, the space occupied is reduced by one-half. In order to obtain a more comfortable eating position of the animals, there may be disposed one or more inclined floorboards below feeding troughs 1.

Figure 2:
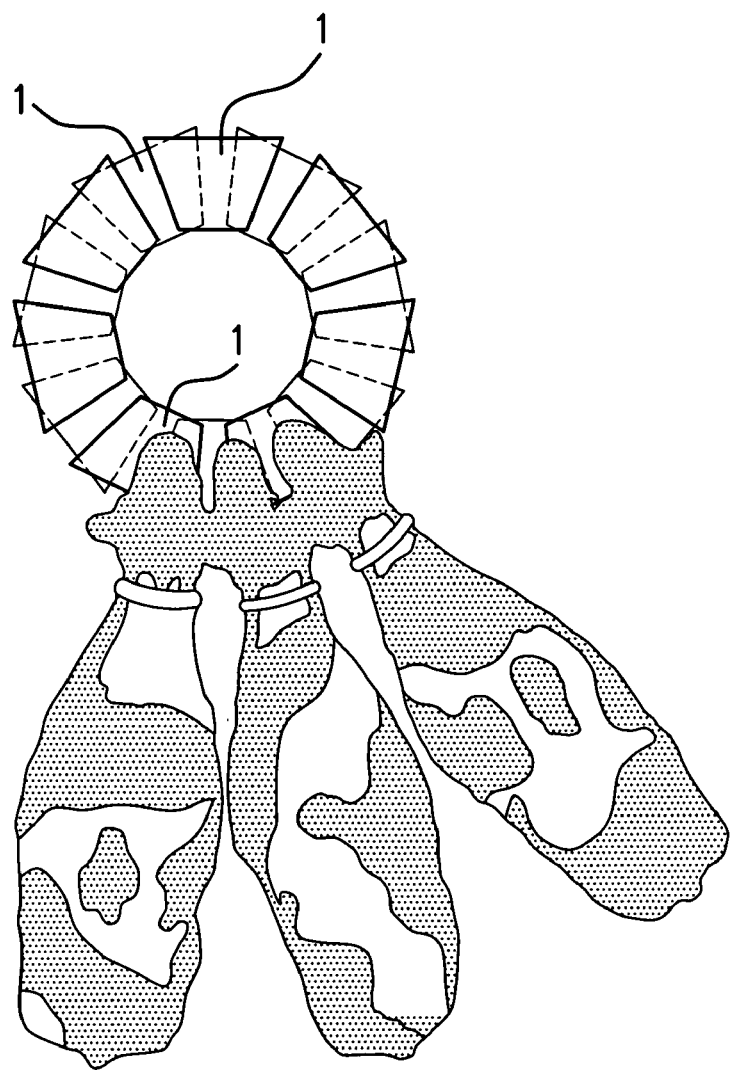
FIG. 2 is a plan view of a structure for feeding animals according to the invention, said structure comprising an imaginary axis.

FIG. 2 is a plan view of a structure, in which the identical feeding troughs 1 are disposed at a fixed distance from the imaginary axis. The structure is adapted for feeding fourteen animals simultaneously.

In a plan view the animals are positioned at the outside of the feeding troughs 1 around the imaginary axis. The animals are able to approach the imaginary axis up to a distance at which they almost touch each other.

FIG. 3 is again a plan view of a structure for feeding animals according to the invention, said structure comprising an imaginary axis.

Figure 3:
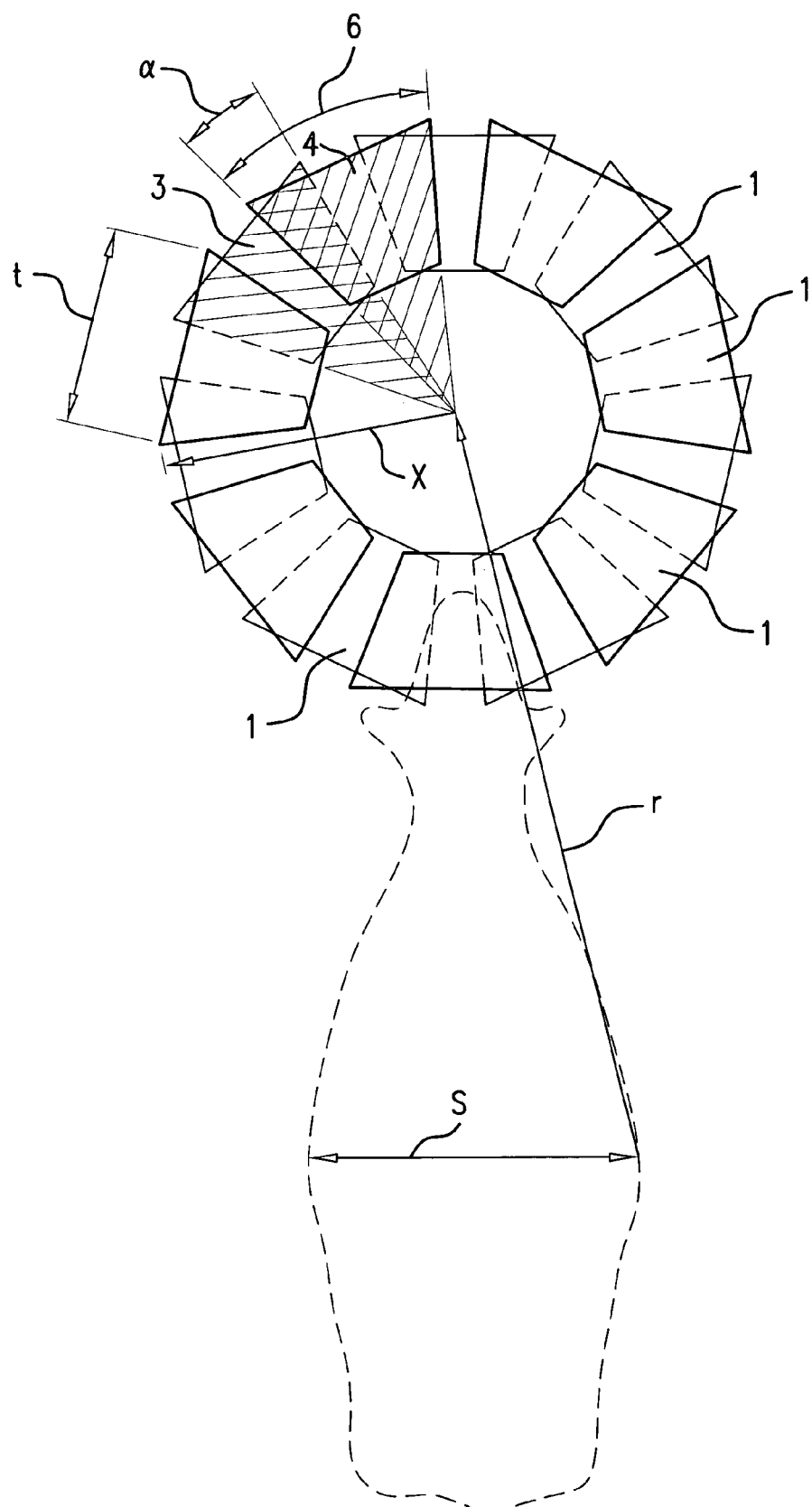
FIG. 3 is again a plan view of a structure for feeding animals according to the invention, said structure comprising an imaginary axis.

Assuming that the animals have approximately uniform dimensions, N is the number of animals that are able to position themselves around the imaginary axis at a fixed distance from the imaginary axis on the circumference of a circle or at least on a part p of the circumference of a circle. The parameter p is in the range 0<p<1, p=¼ corresponding with a quarter of the circumference of a circle, p=½ corresponding with a one-half of the circumference of a circle, p=1 corresponding with the entire circumference of a circle, etc. Seen in plan view, the uniform feeding troughs 1 have a width t, said width t being defined by the greatest distance between a first point on the opening of the feeding trough 1 and a second point on the opening of the feeding trough 1, said first and second points being located at a fixed distance x from the imaginary axis. In this manner there is formed a first isosceles triangle 3 with a base having a length t, a vertex angle or arc defined as $\phi$, and first and second sides having a length x, said sides extending from the imaginary axis to the respective first and second points. The first isosceles triangle 3 is shown in FIG. 3. A second feeding trough 1 overlaps the first feeding trough 1. Seen in plan view, the second feeding trough 1 has the same dimensions as the first feeding trough 1, the second feeding trough 1 thus also having a width t, such that there is formed a second isosceles triangle 4 with a base having a length t, a vertex angle or arc $\phi$, and first and second sides having a length x. The second feeding trough 1 overlaps the first feeding trough 1 through an angle $\alpha$ which is defined as the angle between the second side of the first isosceles triangle 3 and the first side of the second isosceles triangle 4, such that the overlap $\epsilon$ is defined as $\epsilon = 1 - \alpha/\phi$. On the basis of these data the minimum distance x is defined by the formula:

$$XX = 1/(2\sin(p\pi/\epsilon N))$$

in which the number of animals N depends on the width of the shoulder s of the animal and the distance r from the shoulder to the imaginary axis so that:

$$N = p\pi/(\arcsin/s/2r)$$

The solution to the problem of providing structure for feeding animals provided with feeding troughs 1, thus enabling it to feed relatively many animals simultaneously and to occupy relatively little space in the shed, may also be obtained by means of an alternative implement. For that purpose, the structure for feeding or watering animals N, such as cows, comprises an imaginary axis surrounded by several, substantially identical feeding troughs 1 which, seen in plan view, are disposed at a fixed distance from the imaginary axis on the circumference of a circle or at least on a part p of the circumference of a circle, p being in the range 0<p<1, characterized in that the feeding troughs 1 overlap each other at least partially, while, seen in plan view, a first feeding trough has a width t, said width t being defined by the greatest distance between a first point on the opening of the feeding trough 1 and a second point on the opening of the feeding trough 1, said first and second points being located at a fixed distance x from the imaginary axis, in such a manner that there is formed a first isosceles triangle 3 with a base having a length t, a vertex angle or arc defined as $\phi$, and first and second sides having a length x, said sides extending from the imaginary axis to the respective first and second points, and a second feeding trough 1 has a width t, such that there is formed a second isosceles triangle 4 with a base having a length t, a vertex φ, and a first and second side x, said second feeding trough overlapping the first feeding trough through an angle α defined as the angle between the second side of the first isosceles triangle 3 and the first side of the second isosceles triangle 4, such that the overlap ε is defined as ε=1−α/φ, so that the minimum fixed distance x is defined by the formula:

$$XX=1/(2\sin(p\pi/\epsilon N))$$

In accordance with a feature of this alternative embodiment, the overlap E is in the range ½≦ε≦1, ε=1 corresponding to the feeding troughs 1 which do not overlap each other, but are only contiguous, ε=½ corresponding to feeding troughs 1 entirely overlapping each other, etc. The fixed distance x almost corresponds to the length of the radius of the structure, so that by means of the aforementioned formula it is possible to dimension the structure.

Figure 4:
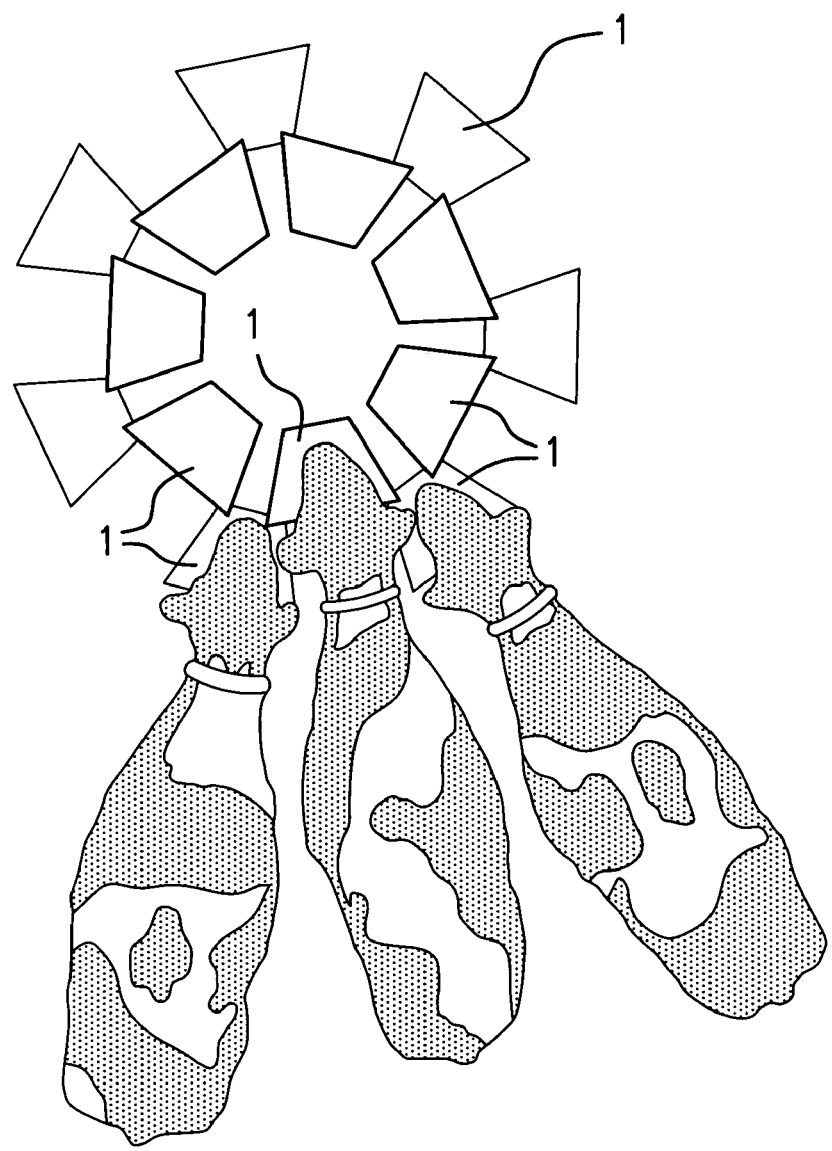
FIG. 4 is a plan view of a structure for feeding animals according to the invention, in which structure the feeding troughs are arranged at a first distance from the imaginary axis and at a second distance from the imaginary axis.

In FIG. 4 the feeding troughs 1 are arranged at a first distance from the imaginary axis and at a second distance from the imaginary axis. Feeding troughs 1 are then disposed in two rings, while the centers of the feeding troughs 1 are shifted relative to each other. The animals eating at the inner ring have to stretch their necks to some extent, while the animals eating at the outer ring have to pull in their necks to some extent. As shown in FIG. 4, the structure together with the eating animals occupies approximately the same space in the shed as a structure in which an equal number of feeding troughs 1 is arranged at a fixed distance from the imaginary axis. However, the structure itself occupies more space than a structure in which an equal number of feeding troughs 1 is arranged at a fixed distance from the imaginary axis. In practice, the animals eating from the outer ring will move somewhat away from the imaginary axis and the animals eating from the inner ring will move somewhat closer to the imaginary axis, so that in practice this structure with eating animals will occupy more space in the shed.

Figure 5:
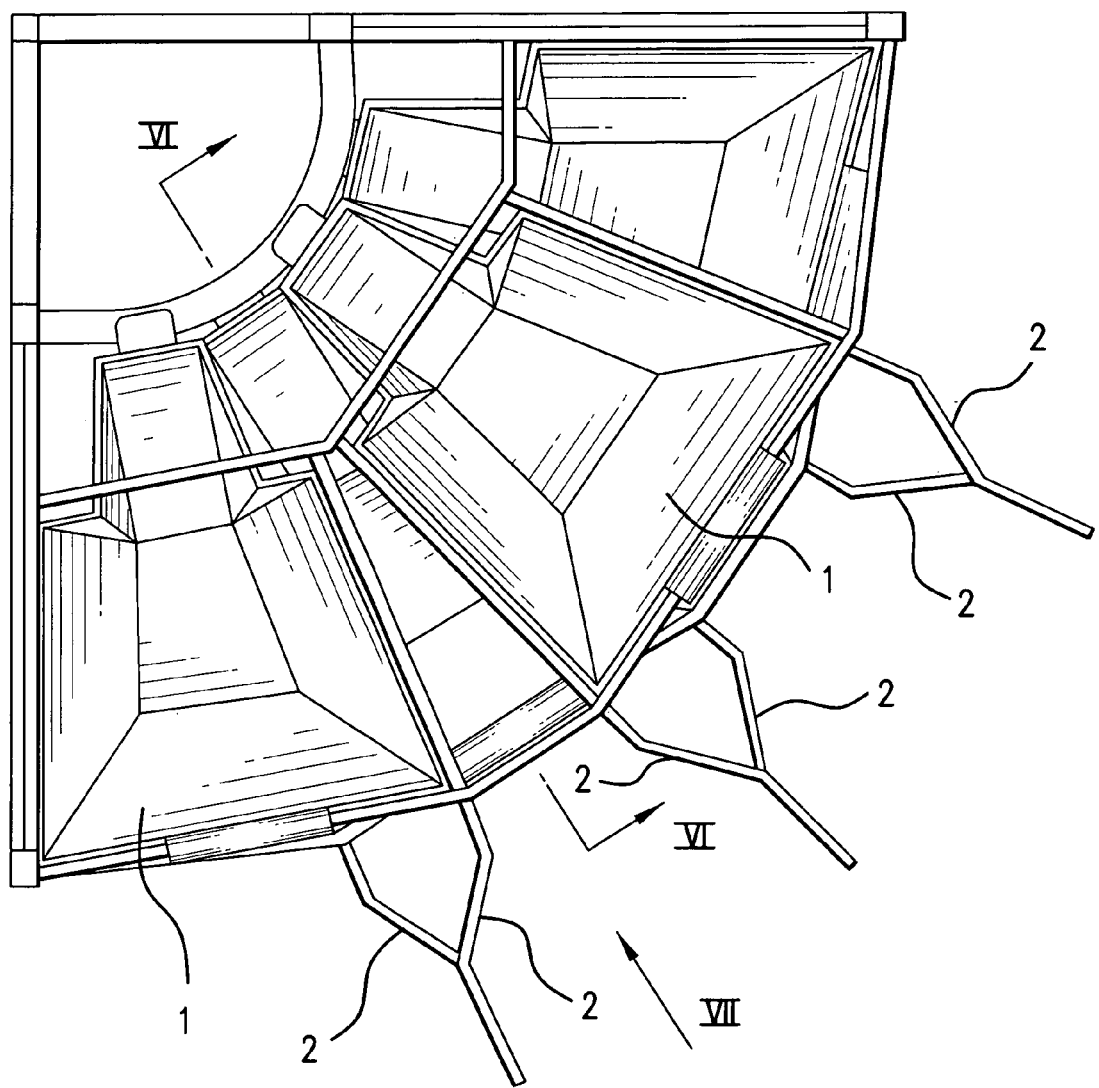
FIG. 5 is a plan view of a structure for feeding animals according to the invention, said structure being provided with partitions.

FIG. 5 shows a plan view of the structure for feeding animals provided with partition elements 2 which are dimensioned and designed to prevent the animals from impeding each other during eating or drinking. For that purpose, partition element 2 is provided with a curve at its side located nearest to the imaginary axis. Feeding troughs 1 are disposed on a part of the circumference of a circle at a fixed distance from an imaginary axis.

Figure 6:
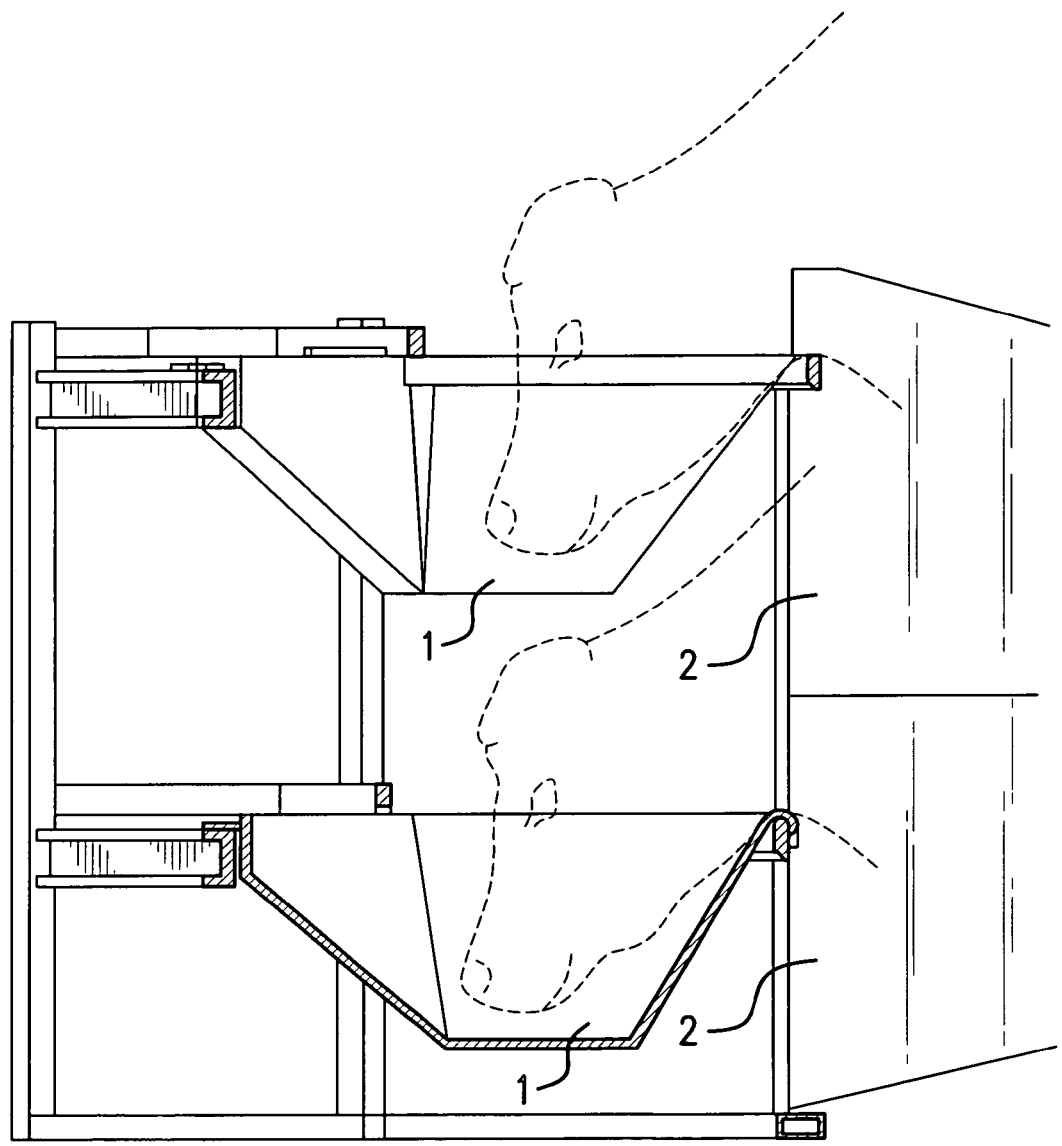
FIG. 6 is a side elevational cross-section of a structure for feeding animals according to the invention taken in section line VI—VI of FIG. 5.

FIG. 6 is a cross-section taken on section line VI—VI of a structure for feeding animals, corresponding to FIG. 5. The animals are able to eat from the feeding troughs 1 as shown in a comfortable manner.

Figure 7:
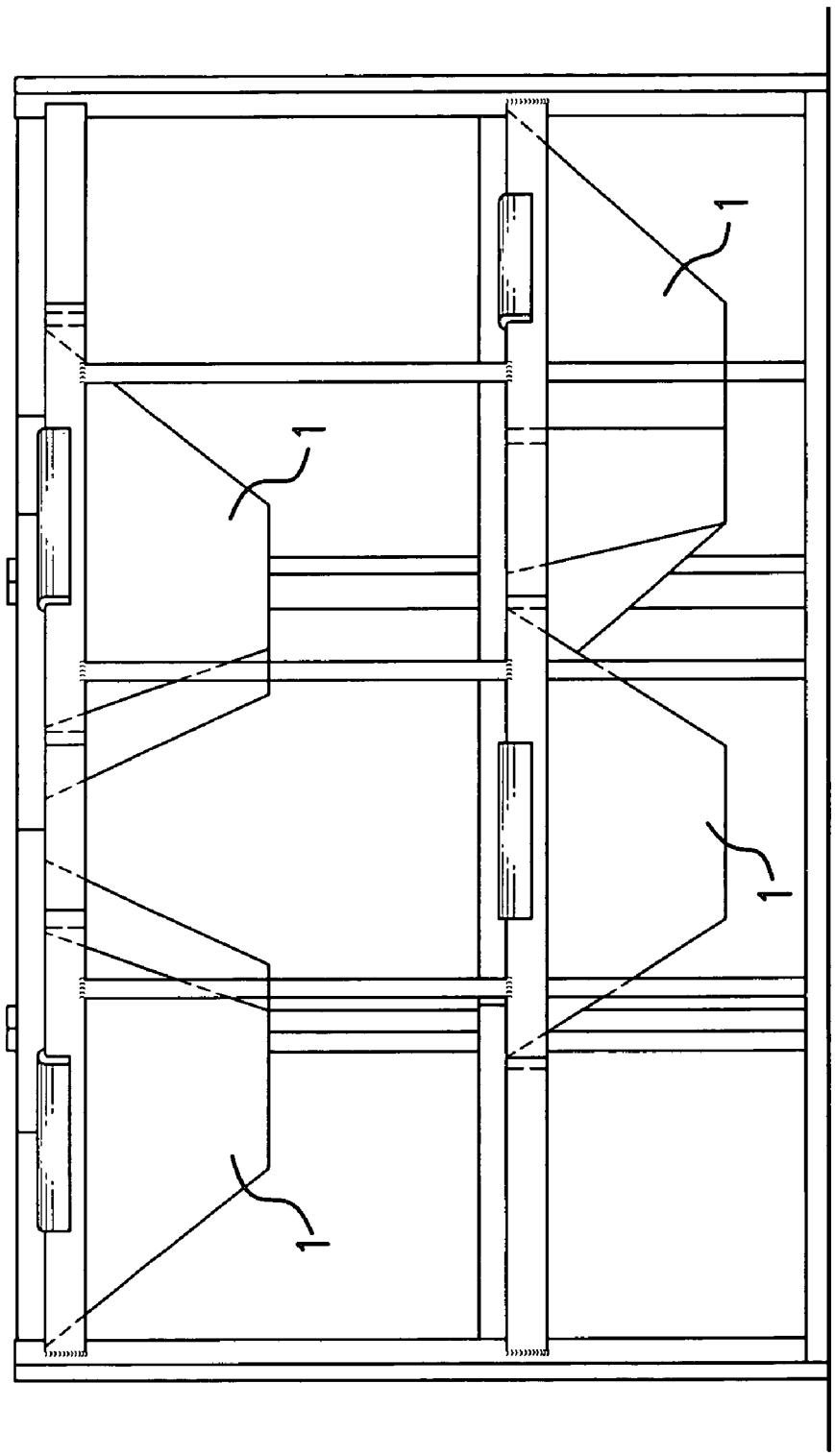
FIG. 7 is a further elevational view of a structure for feeding animals according to the invention as seen in the direction of arrow VII of FIG. 5.

FIG. 7 is a side view of the structure viewed in the direction of arrow in FIG. 5, for feeding animals, in which partition elements 2 are not shown. FIG. 7 thus corresponds to FIGS. 5 and 6. By means of the particular position of feeding troughs 1 overlap each other in plan view.

In particular the identification means and the metering device as described in my aforesaid Application No. NL-A-1010898 are included by reference in this Application.

Although I have disclosed the preferred embodiments of my invention, it is to be understood that it is capable of other adaptations and modifications within the scope of the following claims:

The invention claimed is:

1. A structure for feeding a plurality of animals which number N comprising an imaginary vertical axis surrounded by a plurality of substantially identical feeding troughs, said feeding troughs as seen in plan view, being disposed at a fixed distance from said imaginary vertical axis on a part p of the circumference of a circle, p being in the range 0<p<1, said feeding troughs overlapping each other as seen in plan, a first of said feeding troughs having a width t, said width t being defined by the greatest distance between a first point on an opening of said feeding trough and a second point on said opening of said feeding trough, said first and second points being located at a fixed distance x from said imaginary vertical axis to form a first isosceles triangle with a base equal to t, a vertex angle defined as φ, and first and second sides each having a length x, said sides extending from said imaginary vertical axis to the respective said first and second points, and a second feeding trough having a width t to form a second isosceles triangle with a base equal to a length t, a vertex angle φ, and first and second sides having a length x, which said second feeding troughs partially overlaps said first feeding trough through an angle α which is defined as the angle between said second side of the first isosceles triangle and said first side of said second isosceles triangle, the overlap as so determined by ε being defined as ε=1−α/ε whereby the minimum fixed distance x is defined by the formula:

$$X = 1/(2\sin(p\pi/\varepsilon N)).$$

2. A structure in accordance with claim 1, wherein said overlap ε is in the range ½≦ε≦1.

3. A structure in accordance with claim 2, wherein N comprises fourteen.

4. A structure as claimed in claim 1, wherein said fixed distance x substantially corresponds to a radius of the structure.

* * * * *